United States Patent

[11] 3,574,947

| [72] | Inventors | Karel Stepanek<br>Prague;<br>Josef Klapste, Cesky Brod, Czechoslovakia |
|---|---|---|
| [21] | Appl. No. | 760,168 |
| [22] | Filed | Sept. 17, 1968 |
| [45] | Patented | Apr. 13, 1971 |
| [73] | Assignee | VyzKumny ustav obrabeich stroju a obrabeni Prague, Czechoslovakia |

[54] APPARATUS FOR MEASURING NON-UNIFORMITIES OF A TRANSMISSION
12 Claims, 13 Drawing Figs.

[52] U.S. Cl............................................. 33/179.5,
324/161, 73/162
[51] Int. Cl.............................................. G01m 13/02
[50] Field of Search........................................ 324/69, 70;
33/179.5; 73/162 (Inquired)

[56] References Cited
UNITED STATES PATENTS
2,281,785  2/1958  Lekas............................ 324/69
3,096,590  7/1963  Stepanek....................... 33/179.5

Primary Examiner—Michael J. Lynch
Attorney—Richard Low

ABSTRACT: An electrical signal having a frequency corresponding to the rotary speed of one rotatable member of a transmission having a large transmission ratio is compared in phase with an electrical signal having a frequency corresponding to the rotary speed of the other rotatable member of the transmission in coupling engagement with the one. The determined variations in phase relation of the signals are indicative of nonuniformities of the transmission.

Patented April 13, 1971 3,574,947

INVENTORS
Karel Štěpánek, Josef Klápště
By Richard ___
Ag't

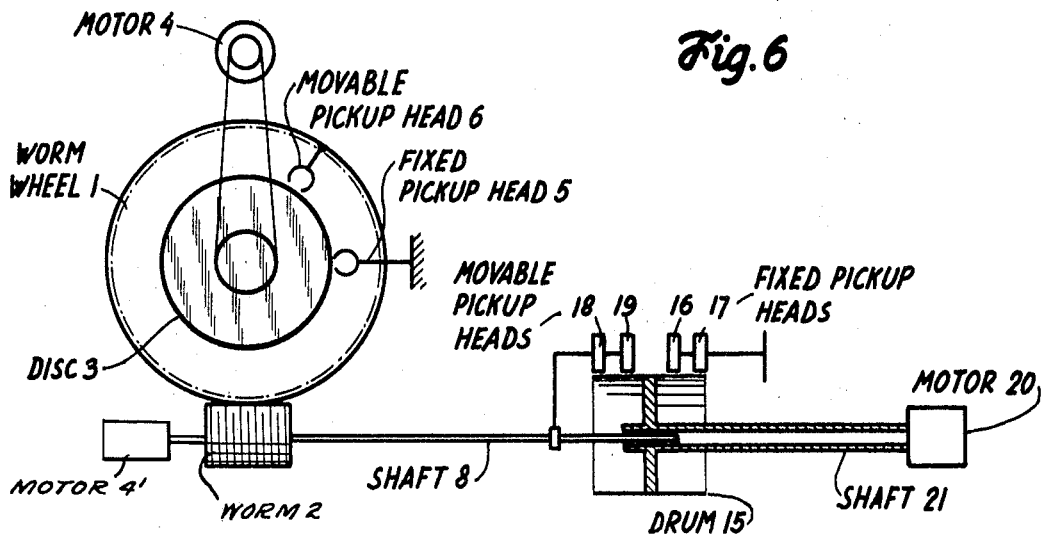
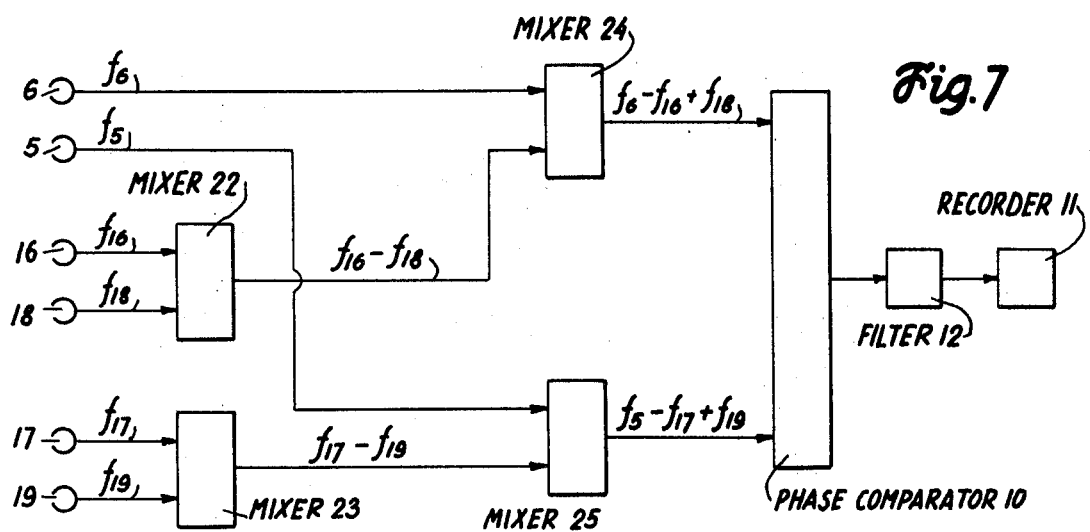
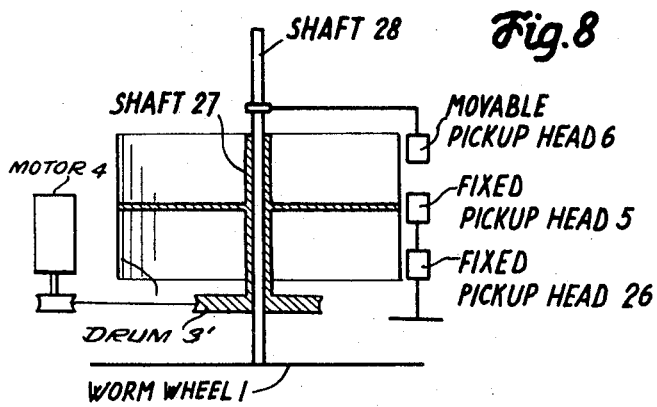

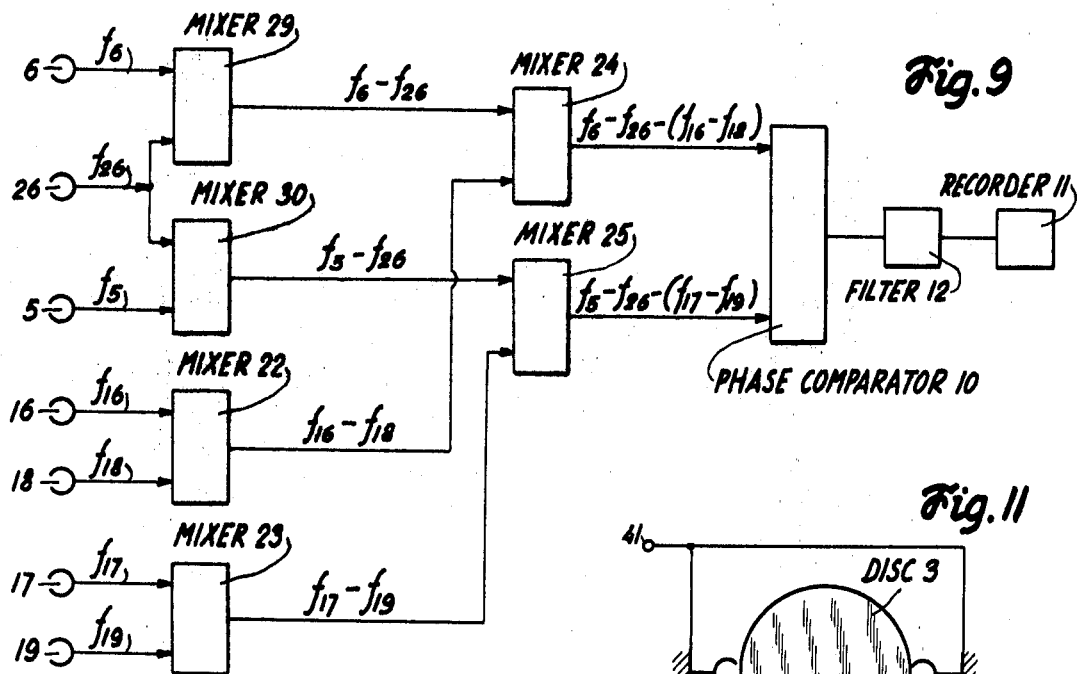
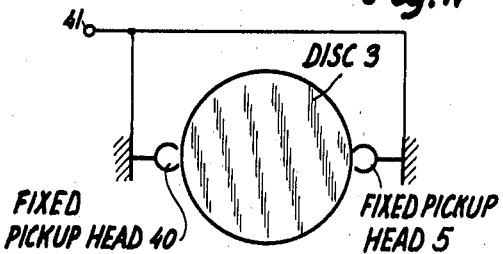
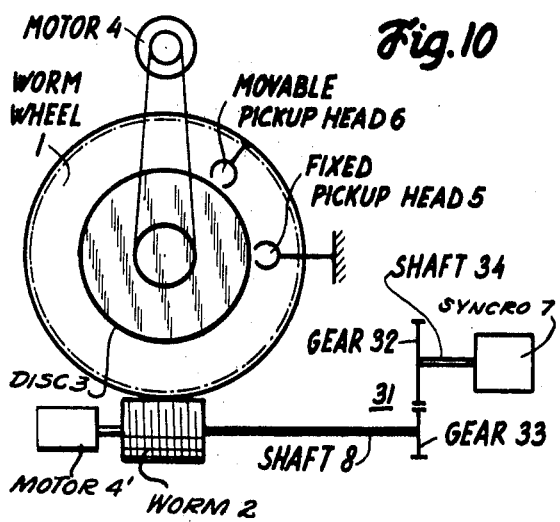
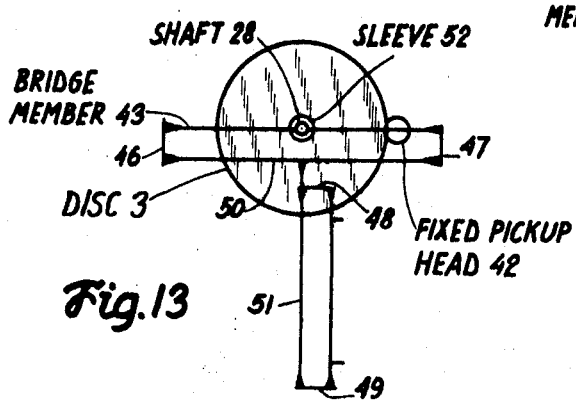

APPARATUS FOR MEASURING NON-UNIFORMITIES OF A TRANSMISSION

DESCRIPTION OF THE INVENTION

The present invention relates to large ratio transmissions. More particularly, the invention relates to apparatus for measuring nonuniformities of a large ratio transmission.

It is difficult to exactly measure the nonuniformities of a transmission having a pair of rotatable members in coupling engagement with each other at a large transmission ratio, of greater than 1:20, for example. The nonuniformities of transmissions are determined by so-called kinematic faults, which indicate deviations of the actual transmission ratio from an ideal transmission ratio of the same magnitude. These deviations are measured in angular seconds or in micrometers.

Nonuniformities of a transmission are measured by seismic, mechanical or optical systems, each of which has a number of drawbacks or disadvantages which prevent their use on a large scale or to a great extent.

The principal object of the present invention is to provide new and improved apparatus for measuring nonuniformities of a transmission.

An object of the present invention is to provide apparatus for measuring nonuniformities of a transmission, which apparatus overcomes the disadvantages of known systems.

An object of the present invention is to provide apparatus for measuring nonuniformities of a transmission, which apparatus is of simple structure and functions with accuracy, efficiency, effectiveness and reliability.

In accordance with the present invention, a method for measuring nonuniformities of a transmission having a pair of rotatable members in coupling engagement with each other at a large transmission ratio comprises the steps of producing an alternating electrical signal having a frequency corresponding to the rotary speed of one of the members, producing an alternating electrical signal having a frequency corresponding to the rotary speed of the other of the members, and determining variations in phase relation of the signals, which variations are indicative of nonuniformities of the transmission.

In accordance with the present invention, one embodiment of apparatus for measuring nonuniformities of a transmission having a pair of rotatable members in coupling engagement with each other at a large transmission ratio comprises first generating means for producing a first alternating electrical signal having a first frequency corresponding to the rotary speed of one of the members. Second generating means produces a second alternating electrical signal having a second frequency corresponding to the rotary speed of the other of the members. Adjusting means connected to the first and second generating means adjusts the first and second signals to equality. Phase comparing means connected to the adjusting means compares relative phase variations of the first and second signals. One of the members of the transmission rotates at a speed which is less than that at which the other of the members rotates.

The first generating means comprises a disc coaxially mounted with the one of the members of the transmission. The disc has two substantially equal tracks thereon each having signal indicia recorded therein. A drive coupled to the disc rotates the disc at a rotary speed different from the rotary speed of the one of the members. A fixedly supported pickup head in operative proximity with one of the tracks on the disc senses the signal indicia recorded in the one track. A movably supported pickup head affixed to and rotating with the one of the members in operative proximity with the other of the tracks on the disc senses the signal indicia recorded in the other track. The second generating means comprises a Selsyn device coupled to the other of the members of the transmission for rotation therewith.

In another embodiment of the apparatus, the disc of the first generating means has a third track thereon having signal indicia recorded therein and the first generating means further comprises an additional fixedly supported pickup head in operative proximity with the third track on the disc for sensing the signal indicia recorded in the third track. The third track has a number of indications which differs from the number of indications of the other tracks by an amount determined by the frequency of signals produced by the Selsyn device and the revolutions per second of the disc. The number of indications in the third track may be four times greater than the number of indications in the other tracks.

In another embodiment of the apparatus, the Selsyn device is coupled to the other of the members of the transmission by coupling gears, one of the gears being affixed to and rotating with the other of the members and another of the gears being affixed to and rotating with the Selsyn device. The gears are in coupling engagement with each other thereby adapting the apparatus for measurements of nonuniformities of transmissions, having different transmissions ratios.

In another embodiment of the present invention, the first generating means comprises a disc coaxially mounted with the one of the members of the transmission. The disc has two substantially equal tracks thereon each having signal indicia recorded therein. A drive coupled to the disc rotates the disc at a rotary speed different from the rotary speed of the one of the members. A fixedly supported pickup head in operative proximity with one of the tracks on the disc senses the signal indicia recorded in the one track. A movably supported pickup head affixed to and rotating with the one of the members in operative proximity with the other of the tracks on the disc senses the signal indicia recorded in the other track. The second generating means comprises a drum coaxially mounted with the other of the members of the transmission. The drum has four substantially equal tracks thereon each having signal indicia recorded therein. A drive coupled to the drum rotates the drum at a rotary speed different from the rotary speed of the other of the members. A pair of fixedly supported pickup heads each in operative proximity with a corresponding one of the tracks on the drum sense the signal indicia recorded in two of the tracks. A pair of movably supported pickup heads coupled to and rotating with the other of the members each in operative proximity with a corresponding one of the other tracks on the drum sense the signal indicia recorded in the remaining two of the tracks.

The signal indicia in the two tracks on the drum sensed by the fixedly supported pickup heads differ from each other by one indication and the signal indicia in the two tracks on the drum sensed by the movably supported pickup heads differ from each other by one indication. The disc of the first generating means may have a third track thereon having signal indicia recorded therein and the first generating means may further comprise an additional fixedly supported pickup head in operative proximity with the third track on the disc for sensing the signal indicia recorded in the third track. The adjusting means may comprise means electrically connected to the pickup heads for converting the signals sensed by the pickup heads to difference frequencies. The third track has a number of indications which differ from the number of indications in the other tracks by an amount determined by a desired difference frequency.

In an embodiment for eliminating eccentricity in the apparatus of the present invention, the first generating means includes a disc coaxially mounted with the one of the members of the transmission. The disc has a track thereon having signal indicia recorded therein. A fixedly supported pickup head in operative proximity with the track senses the signal indicia recorded in the track. An additional fixedly supported pickup head is in operative proximity with the track. The pickup heads are positioned diametrically opposite each other relative to the disc and have electrical output leads connected in series with each other thereby eliminating an adverse effect due to eccentricity of the disc and the one of the members.

In another embodiment for eliminating eccentricity in the apparatus of the present invention, the first generating means includes a disc coaxially mounted with the one of the members of the transmission. The disc has a track thereon having signal indicia recorded therein. A fixedly supported pickup head in operative proximity with the track senses the signal indicia recorded in the track. A frame is provided for the apparatus. A bridge member has a sleeve formed therein coaxially positioned around the shaft of the one of the members. Resilient means mounts the bridge member on the frame thereby eliminating an adverse effect due to the eccentricity of the disc and the one of the members.

In one embodiment, the resilient means comprises steel bands. In another embodiment, the resilient means comprises a plurality of mutually parallel and mutually perpendicular steel bands.

In order that the present invention may be readily carried into effect, it will now be described with reference to the accompanying drawings, wherein:

FIG. 6 is a schematic diagram of another embodiment of the apparatus of the present invention for measuring nonuniformities of a transmission;

FIG. 7 is a block diagram of the electrical system of the embodiment of FIG. 6;

FIG. 8 is a schematic diagram of a modification of part of the embodiment of FIG. 6;

FIG. 9 is a block diagram of the electrical system of the embodiment of FIG. 8;

FIG. 10 is a schematic diagram of another embodiment of the apparatus of the present invention for measuring nonuniformities of a transmission;

FIG. 11 is a schematic diagram of an embodiment of apparatus for eliminating the influence of eccentricity of the apparatus of the present invention on the accuracy of measurement;

FIG. 12 is a schematic diagram of another embodiment of the apparatus of FIG. 11; and FIG. 13 is a schematic diagram of another embodiment of the apparatus of FIG. 11.

In the FIGS., the same components are identified by the same reference numerals.

Figure 1:
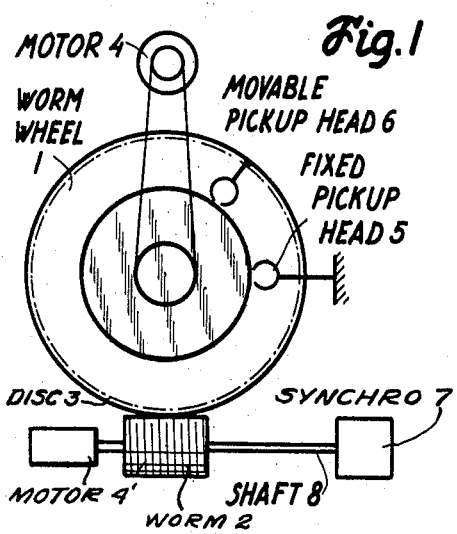
FIG. 1 is a schematic diagram of an embodiment of the apparatus of the present invention for measuring nonuniformities of a transmission.

In FIG. 1, the transmission comprises a rotatable worm wheel 1 in coupling engagement with a rotatable worm 2. The worm wheel 1 rotates slowly relative to the worm 2. A disc 3 is rotatably mounted coaxially with and near the worm wheel 1. The disc 3 is coupled to a motor 4 which drives said disc so that it revolves coaxially with the worm wheel 1. The worm 2 is coupled to a motor 4'.

Two equal tracks of magnetic variations or physical indentation, grooves, channels, notches, teeth, or the like, are provided on the disc 3. The magnetic variations or physical indentations $z5$ of one track equal the magnetic variations or physical indentations $z6$ of the other track. An indentation is intended to mean, as described, a physical indentation, or the like, or a magnetic variation, or the like, as described, and as commonly used in sound recording, for example.

The transmission ratio $i1$ is the number of magnetic variations or indentations of each track on the disc 3, so that $i1=zaq5=z6$. A fixedly supported pickup or readout head 5 of any suitable type is positioned in operative proximity with one of the tracks $z5$ on the disc 3 and may be supported immovably by the frame of the apparatus. A movable pickup or readout head 6 of any suitable type is affixed to and rotates with the worm wheel 1 and is positioned in operative proximity with the other of the tracks $z6$ on the disc 3. A two-phase, two-pole synchro device 7 is affixed to the shaft 8 of the worm 2 which is driven at a rate between 0—600 r.p.m.'S.

The synchro device 7 comprises a stator and a rotor. The rotor being connected to shaft 8, so as to rotate with it. The winding or coil of the stator is supplied with two-phase alternating current from a converter 9 inducing in the rotor a voltage similarly as in a transformer. The General Electric Company manufactures a suitable and preferred synchro device under the Registered Trademark "Selsyn." In the following description the term "Selsyn" is used interchangeable for synchro device.

Broadly, the synchro device translates mechanical variables such as rotation or linear movement into electrical signals which can be measured or reconverted to control mechanical variable devices. A full description of such devices is contained on pages 162 and 163 of a textbook entitled, "Manual of Electromechanical Devices," edited by Douglas C. Greenwood, 1965, McGraw-Hill Book Company.

Figure 2:
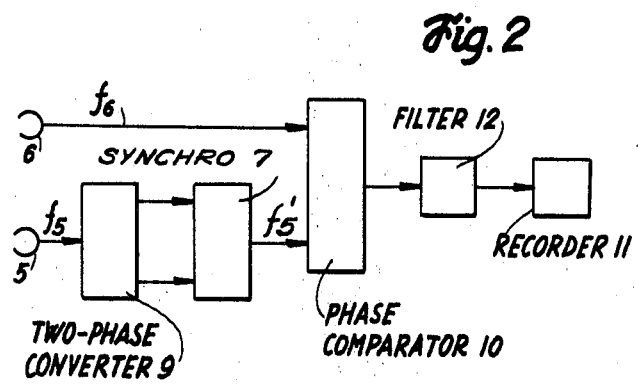
FIG. 2 is a block diagram of the electrical system of the embodiment of FIG. 1.

In FIG. 2, the fixed pickup head 5 is electrically connected to and supplies its output electrical signals to a two-phase converter 9 of any suitable type which converts said signals to two signals having a phase difference of 90° relative to each other. The 90° phase difference signals are supplied to the synchro device 7 which supplies a single signal to a phase comparator 10 of any suitable type.

The movable pickup head 6 is electrically connected to and supplies its output electrical signals to the phase comparator 10. The phase comparator 10 compares the phase variations between the signals supplied by the fixed pickup head 5 and the signals supplied by the movable pickup head 6 and provides an indication of such variations, which indication may be recorded by any suitable recorder 11 after being filtered by any suitable filter 12.

If the transmission is at a standstill, the frequency $f_5$ induced in the fixed pickup head 5 is $f_5=z5n3$ and the frequency $f_6$ induced in the movable pickup head 6 is $f'_6=z6n3=z5n3$ wherein $n3$ is the number of revolutions of the disc 3. The disc 3 is rotated at any desired number of revolutions such as, for example, 20 revolutions per second.

If the worm wheel 1 rotates at $k1$ revolutions per second, the frequency $f_6$ induced in the movable pickup head 6 is $f_6=z6n3\pm z6k1$ The plus or minus depends upon whether the worm wheel 1 and the movable head 6 rotate in the same direction as the disc 3 or in the opposite direction from said disc.

The stator of the synchro device 7 is supplied with the 90° phase difference signals from the two-phase converter 9. If both the worm 2 and the synchro device 7 are at standstill, the frequency $f_5$ induced in the fixed pickup head 5 and supplied to the stator of said synchro device is induced in the rotor of said synchro device.

If the worm 2 and the synchro device 7 rotate at $k2$ revolutions per second, the frequency $f_5'$ induced in the rotor of the synchro device 7 is $f_5'=z5n3\pm k2$ The plus or minus depends upon whether the rotor of the synchro device 7 rotates in the same direction as or opposite direction from the magnetic field of the stator of said synchro device.

Since $$\frac{k2}{k1}=il=z5=z6$$

then $k2=z5k1$ and $f_5'=z5n3\pm z5k1=z6n3\pm z6k1=f_6$

The frequency $f_5'$ induced in the rotor of the synchro device 7 is thus equal to the frequency $f_6$ induced in the movable pickup head 6.

The variations in phase indicated or measured by the phase comparator 10 and recorded by the recorder 11 correspond to the nonuniformities of the transmission or its kinematic fault.

Figure 3:
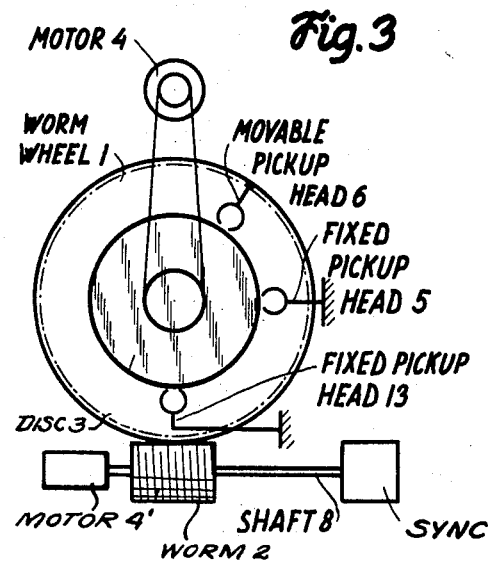
FIG. 3 is a schematic diagram of another embodiment of the apparatus of the present invention for measuring nonuniformities of a transmission.
Figure 4:
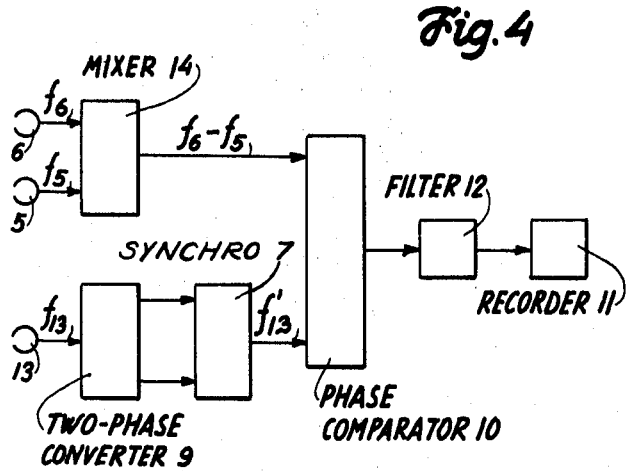
FIG. 4 is a block diagram of the electrical system of the embodiment of FIG. 3.

Since the frequencies $f_5$ and $f_6$ induced in the fixed and movable pickup heads 5 and 6, respectively, are usually high such as, for example, 20 kilocycles per second, and current synchro device are designed for low frequencies, frequency reduction may be provided, as shown in FIGS. 3 and 4, to bring the frequency $f_5$ induced in the fixed pickup head 5 to 400 cycles per second.

In the embodiment of FIGS. 3 and 4, the frequency of the signal supplied to the synchro device 7 is reduced. In the embodiment of FIGS. 3 and 4, a third track $z13$ of magnetic variations or physical indentations, grooves, channels, notches, teeth, or the like, are provided on the disc 3.

Another fixedly supported pickup or readout head 13 of any suitable type is positioned in operative proximity with the track $z13$ on the disc 3 and may be supported immovably by the frame of the apparatus.

In FIG. 4, each of the fixed pickup head 5 and the movable pickup head 6 is electrically connected to and supplies its output electrical signals to a mixer 14 of any suitable type, which converts said signals to a difference signal $f_6 - f_5$. The difference signal $f_6 - f_5$ is supplied to the phase comparator 10.

The fixed pickup head 13 is electrically connected to and supplies its output electrical signals to the two-phase converter 9. The 90° phase difference signals are supplied to the synchro device 7 which supplies a single signal to the phase comparator 10.

The track $z6$ of the disc 3, for the movable pickup head 6, has a number of magnetic variations or physical indentations, or the like, which is determined by the magnitude of the transmission ratio $z6=i1$. The track $z5$ of the disc 3, for the fixed pickup head 5, has a number of magnetic variations or physical indentations, or the like, which is greater or less than those of the track $z6$ by a number $m$. Thus, $z5 = z6 \pm m$ The magnitude of $m$ is determined by $$m = \frac{f_s}{n3}$$

where $f_n$ is the nominal frequency of the rotor of the synchro device motor 7 and $n3$, as previously, is the number of revolutions per second of the disc 3. The track $z13$ of the disc 3, for the fixed pickup head 13, has $m$ magnetic variations or physical indentations, or the like.

The frequency $f_6 - f_5$ produced by the mixer 14 is
$f_6 - f_5 = z6n3 \pm z6k1 - (z6 - m)n3 = mn3 \pm z6k1$
The two phases produced by the two-phase converter 9 are derived from the frequency $f_{13}$ induced in the fixed pickup head 13, which frequency $f_{13} = mn3$ The rotor of the synchro device 7 produces a frequency $f_{13}'$ which is $f_{13}'mn3 \pm k2 = mn3 \pm z6k1 = f_6 - f_5$ The frequency $f_{13}$ induced in the fixed pickup head 13 (FIGS. 3 and 4) is readily and accurately converted to two 90° phase difference signals by the two-phase converter 9 of FIG. 4 so that a track having $4m$ magnetic variations or physical indentations may be selected. The frequency $f_{13}$ induced in the fixed pickup head 13 is then four times the frequency $f_s$, which is the nominal frequency of the rotor of the synchro device 7.

Figure 5:
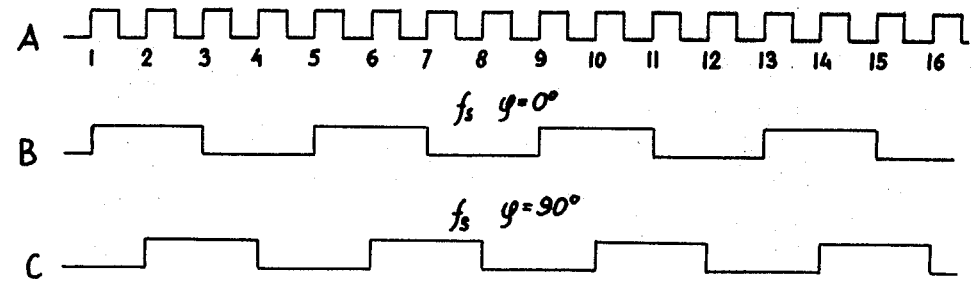
FIG. 5 is a graphical presentation of waveforms illustrating the derivation of a two phase signal from a signal four times the frequency.

A frequency divider of any suitable type may be utilized as the two-phase converter 9 (FIGS. 2 and 4). The output of the two-phase converter 9 is a two-phase frequency $f_s$, as shown in FIG. 5. The two-phase converter 9 comprises any suitable pulse shaper for converting the sinusoidal signals induced in the fixed pickup head 13 to square wave signals, as shown in curve A of FIG. 5.

A suitable flip-flop circuit combination may be utilized in the two-phase converter 9 as a divide-by-four circuit, so that said converter produces a frequency which is equal to the nominal frequency $f_s$ of the synchro device 7. A suitable divide-by-two frequency divider may comprise, for example, that shown in FIG. 14–37 on page 478 and described on pages 478 and 479 of "Electron Tube Circuits" by Samuel Seely, Second Edition, 1958, McGraw-Hill Book Co., Inc., New York. A divide-by-two frequency divider which may be utilized as a single stage of the frequency dividers, and which may be utilized twice in a divide-by-four frequency divider, is shown in FIG. 9–4 and described on pages 131, 132 and 133 of Volume 6, entitled, "Solid-State Computer Circuits," of "Computer Basics" by Technical Education and Management, Inc., First Edition, 1962, Howard W. Sams & Co., Inc., The Bobbs-Merrill Company, Inc., Indianapolis and New York. A frequency divider is shown in FIG. 12–3 and described on pages 174 and 175 of "Directory of Electronic Circuits" by Matthew Mandl, 1966, Prentice-Hall, Inc., Englewood Cliffs, New Jersey. A multipurpose frequency divider, which may be utilized as a frequency divider, is shown and described on pages 10–7 and 10–8 of "A Handbook of Selected Semiconductor Circuits," NAVSHIPS 93484, 1960. Each cycle of the output frequency $f_s$ of the two-phase converter 9, as shown in curves B and C of FIG. 5, equals four cycles of the input frequency $f_{13}$ of said converter, and the output signals are 90° from each other in phase. The stator of the synchro device 7 is thus supplied with two signals of the same frequency and 90° phase difference.

In the embodiment of FIGS. 6 and 7, the synchro device 7 of the embodiment of FIGS. 1 and 2 is replaced by a movable pickup arrangement. The additional movable pickup arrangement of the embodiment of FIGS. 6 and 7 comprises a drum of cylinder 15 having four equal tracks of magnetic variations or physical indentations, grooves, channels, notches, teeth, or the like, provided on its cylindrical surface. A pair of fixedly supported pickup or readout heads 16 and 17 of any suitable type are positioned in operative proximity with two of the tracks $z16$ and $z17$, respectively, on the drum 15. A pair of movable pickup or readout heads 18 and 19 of any suitable type are affixed to and rotate with the shaft 8 of the worm 2 and are positioned in operative proximity with the remaining two tracks $z18$ and $z19$, respectively, on the drum 15.

A motor 20 is coupled to a hollow shaft 21 coaxially positioned around part of the shaft 8 of the worm 2 and mounting the drum 15. The shafts 8 and 21 are not in contact and rotate freely from each other. The motor 20 drives the drum 15 at $n15$ revolutions per second.

The numbers of magnetic variations or physical indentations of the tracks $z16$ and $z17$ and the tracks $z18$ and $z19$ on the drum 15 differ by one variation or indentation. Thus, for example, if the track $z16$ has 120 magnetic variations or physical indentations, the track $z17$ has 119 magnetic variations or physical indentations. If the track $z18$ has 100 magnetic variations or physical indentations, for example, the track $z19$ has 99 magnetic variations or physical indentations.

The frequencies $f_5$, $f_6$, $f_{16}$, $f_{17}$, $f_{18}$ and $f_{19}$ induced in the pickup heads 5, 6, 16, 17, 18 and 19 of FIG. 6 are as follows:
$f_5 = 5n3$
$f_6 = z6n3 \pm z6k1$
$f_{16} = z16n15$
$f_{17} = (z16 - 1)n15$
$f_{18} = z18n15 \pm z18k2$
$f_{19} = (z18 - 1)n15 \pm (z18 - 1)k2$ In FIG. 7, each of the pickup heads 16 and 18 is electrically connected to and supplies its output electrical signals to a mixer 22 of any suitable type, which converts said signals to a difference signal $f_{16} - f_{18}$. The difference signal $f_{16} - f_{18}$ is supplied to a mixer 24. Each of the pickup heads 17 and 19 is electrically connected to and supplies its output electrical signals to a mixer 23 of any suitable type, which converts said signals to a difference signal $f_{17} - f_{19}$. The difference signal $f_{17} - f_{19}$ is supplied to a mixer 25.

The pickup head 6 is electrically connected to and supplies its output electrical signals to the mixer 24, which converts said signals and the difference signal $f_{16}-f_{18}$ to a resultant difference signal $f_6-(f_{16}-f_{18})$ or $f_6-f_{16}+f_{18}$. The resultant difference signal $f_6-f_{16}+f_{18}$ is supplied to the phase comparator 10. The pickup head 5 is electrically connected to and supplies its output electrical signals to the mixer 25, which converts said signals and the difference $f_{17}-f_{19}$ to a resultant difference signal $f_5-(f_{17}-f_{19})$ or $f_5-f_{17}+f_{19}$. The resultant difference signal $f_5-f_{17}f_{19}$ is supplied to the phase comparator 10.

The resultant difference signals are equal in frequency, as shown by the following:

$f_6-(f_{16}-f_{18})+f_5-(f_{17}-f_{19})$
$z6n3 \pm z6k1-z16n15+z18n15\pm z18k2=$
$z5n3-z16n15+n15+z18n15-n15\pm z18k2\pm k2$ since $z6n3=z5n3$ and $z6k1=k2$ The difference frequencies provided by the mixers are produced only if the frequencies supplied to said mixers do not differ too considerably from each other in magnitude. This prevents the difference frequency from being substantially less than the supplied frequencies such as, for example, five times less.

The embodiment of FIGS. 8 and 9 produces difference frequencies. In FIG. 8, an additional track z26 is provided on a drum or cylinder 3' which is the equivalent of the disc 3 being driven by motor 4 of the previously described embodiments and which is mounted and functions in the same manner as said disc. The remainder of the embodiment of FIG. 8 is the same as that of the embodiment of FIG. 6 except for the additional movable pickup arrangement of FIG. 6.

The drum 3' of FIG. 8 thus has three equal tracks of magnetic variations or physical indentations, grooves, channels, notches, teeth, or the like, provided on its cylindrical surface. The fixedly supported pickup head 5 is positioned in operative proximity with the track z5 on the drum 3'. An additional fixedly supported pickup or readout head 26 of any suitable type is positioned in operative proximity with the track z26 on the drum 3'. The movably supported pickup head 6 is positioned in operative proximity with the track z26 on the drum 3'.

The drum 3' is mounted on a hollow shaft 27 coaxially positioned around part of the shaft 28 of the worm wheel 1. The shafts 27 and 28 are not in contact and rotate freely from each other.

The number $r$ of magnetic variations or physical indentations of the track z26 is greater or less than the number of magnetic variations or physical indentations of each of the tracks z5 and z6 on the drum 3'. The number $r$ is selected so that it provides the desired difference frequencies.

In FIG. 9, the pickup head 26 is electrically connected to and supplies its output electrical signals to a mixer 29 of any suitable type and to a mixer 30 of any suitable type. The pickup head 6 is electrically connected to and supplies its output electrical signals to the mixer 29, which converts the signals supplied to it to a difference signal $f_6-f_{26}$. The difference signal $f_6-f_{26}$ is supplied to the mixer 24. The pickup head 5 is electrically connected to and supplies its output electrical signals to the mixer 30, which converts the signals supplied to it to a difference signal $f_5-f_{26}$. The difference signal $f_5-f_{26}$ is supplied to the mixer 25.

Each of the pickup heads 16 and 18 is electrically connected to and supplies its output electrical signals to the mixer 22, which converts the signals supplied to it to a difference signal $f_{16}-f_{18}$. The difference signal $f_{16}-f_{18}$ is supplied to the mixer 24, which converts the signals supplied to it to a resultant difference frequency $f_6-f_{26}-(f_{16}-f_{18})$ or $f_6-f_{26}-f_{16}+f_{18}$. The resultant difference signal $f_6-f_{26}-f_{16}+f_{18}$ is supplied to the phase comparator 10.

Each of the pickup heads 17 and 19 is electrically connected to and supplies its output electrical signals to the mixer 23, which converts the signals supplied to it to a difference signal $f_{17}-f_{19}$. The difference signal $f_{17}-f_{19}$ is supplied to the mixer 25, which converts the signals supplied to it to a resultant difference frequency $f_5-f_{26}-(f_{17}-f_{19})$ or $f_5-f_{26}-f_{17}+f_{19}$. The resultant difference signal $f_5-f_{26}-f_{17}+f_{19}$ is supplied to the phase comparator 10.

Since the frequency $f_{26}$ induced in the fixed pickup head 26 is $f_{26}=(z5\pm r)n3'=(z6\pm r)n3'$, said frequency may be varied by varying $r$. The difference frequencies $f_6-f_{26}$ and $f_5-f_{26}$ may also be varied, so that the mixers 24 and 25 of FIG. 9 may provide difference frequencies.

The nonuniformities of the transmission ratios $i1=z5=z6$ are readily and accurately determined or measured by the aforedescribed embodiment of FIGS. 8 and 9 of the apparatus of the present invention. Nonuniformities of other transmission ratios may be measured by the embodiment of FIGS. 8 and 9 by coupling the synchro device 7 as in the embodiment of FIGS. 1 and 2, or by replacing the direct coupling of said synchro device to the worm 2 via the shaft 8 with a transmission or gear coupling.

In the embodiment of FIG. 10, the synchro device 7 is coupled to the worm 2 via the shaft 8 of said worm and a transmission 31. The transmission 31 comprises a gear 32 affixed to the shaft 8 and a gear 33 affixed to the shaft 34 of the synchro device 7 and in coupling engagement with the gear 32. The gears 32 and 33 are removable so that they may be exchanged. The transmission 31 provides an overall transmission ratio, relative to the synchro device or movable pickup head, which is $i1=z5=z6$.

The magnitude of the auxiliary transmission ratio provided by the embodiment of FIG. 10 is $i1/i$. The transmission ratio $i$ is generally large, since the apparatus of the present invention measures nonuniformities in transmissions with large transmission ratios. Inaccuracies, faults, nonuniformities, or the like, in the transmission 31 therefore do not adversely affect the accuracy of measurements provided by the overall apparatus. Nonuniformities in transmissions with transmission ratios greater than 1:20 are determined or measured by the apparatus of the present invention with accuracy.

In order for the apparatus of the present invention to provide accurate measurement results, the axis of rotation of the disc 3 and of the worm wheel 1 must be the same. Any eccentricity $e$ in the axes of rotation of the worm wheel 1 and the disc 3 results in an error of $2e$ in the measurement result of the apparatus. Error due to eccentricity may be eliminated by the apparatus of FIGS. 11, 12 and 13, each of which presents a different embodiment.

In FIG. 11, an additional fixedly supported pickup head 40, of the same type as the fixedly supported pickup head 5, is positioned diametrically opposite said head 5 relative to the disc 3. The remaining apparatus, now shown in FIG. 11 to maintain the clarity of illustration, is the same as that of the embodiment of FIG. 1.

The fixed pickup heads 5 and 40 are so positioned that the signals induced therein from the track, with which both heads are in operative proximity, have the same amplitude and are in phase with each other. The pickup heads 5 and 40 are electrically connected to each other in series, so that the resultant signal, provided at the output terminal 41, has an amplitude which is the sum of the amplitudes of the individual signals and a phase which depends upon the eccentricity of the axes of rotation of the worm wheel 1 and the disc 3.

In the embodiment of FIG. 12, a fixedly supported pickup head 42, of the same type as the fixedly supported pickup head 5 of FIG. 11, is fixedly supported on a bridge member 43. The bridge member 43 is mounted on the frame of the apparatus by any suitable resilient means such as, for example, steel bands or wires 44 and 45. FIG. 12 presents two views of the apparatus, with the worm wheel 1 eliminated from the lower view to enhance the clarity of illustration.

The affixing of the bridge member 43 to the frame of the apparatus eliminates the influence of eccentricity of the worm wheel 1 and the disc 3, since such eccentricity does not permit angular deviation of the bridge member 43, although the worm wheel 1 may rotate. Since the bridge member 43 does not deviate angularly, there is no inaccuracy in the measurement result.

In the embodiment of FIG. 13, the fixed pickup head 42 is fixedly supported on the bridge member 43, as in the embodiment of FIG. 12. The bridge member 43 is affixed to the frame of the apparatus by parallel resilient bands or wires 46 and 47 and parallel resilient bands or wires 48 and 49, perpendicular to the bands or wires 46 and 47, and a pair of perpendicular bands or wires 50 and 51.

In each of the embodiments of FIGS. 12 and 13, the shaft 28 of the worm wheel 1 passes coaxially through an aperture or sleeve 52 formed through the bridge member 43. The shaft 28 rotates freely in the sleeve 52.

A difference amplifier of any suitable type may be utilized as the mixer 14 of FIG. 4, each of the mixers 22, 23, 24, and 25 of FIG. 7 and each of the mixers 29, 30, 22, 23, 24, and 25 of FIG. 9. A suitable difference amplifier is described and illustrated on pages 41, 42 and 43 of the aforedescribed "Solid-State Computer Circuits" of "Computer Basics."

A suitable phase comparator which may be utilized as the phase comparator 10 of FIGS. 2, 4, 7 and 9 is shown and described on pages 204 to 208 of a textbook entitled "Data Transmission," by william R. Bennett and James R. Davey, 1965, McGraw-Hill Book Company.

We claim:

1. Apparatus for measuring nonuniformities of a transmission having a pair of rotatable members one of which rotates at a speed less than the other and in coupling engagement with each other at a large transmission ratio, said apparatus comprising:

first generating means for producing a first alternating electrical signal having a first frequency corresponding to the rotary speed on one of said members; said first generating means comprising a disc coaxially mounted with said one of the members of said transmission, said disc having two substantially equal tracks thereon each having a signal indicia recorded therein, driving means coupled to said disc for rotating said disc at a rotary speed different from the rotary speed of said one of said members, a fixedly supported pickup head in operative proximity with one of the tracks on said disc for sensing the signal indicia recorded in said one track, and a movably supported pickup head affixed to and rotating with said one of said members in operative proximity with the other of the tracks on said disc for sensing the signal indicia recorded in said other track;

means for rotating the other of said members at a constant speed;

second generating means for producing a second alternating electrical signal having a second frequency corresponding to the rotary speed of the other of said members, said second generating means comprises a synchro device having a rotor coupled to said other of the members of said transmission for rotation therewith and a stator receiving the signal sensed by said fixed pickup head;

adjusting means connected to said first and second generating means for adjusting said first and second signals to equality; and phase comparing means connected to said adjusting means for comparing relative phase variations of said first and second signals.

2. Apparatus as claimed in claim 1, wherein the disc of said first generating means has a third track thereon having signal indicia recorded therein and said first generating means further comprises an additional fixedly supported pickup head in operative proximity with said third track on said disc for sensing the signal indicia recorded in said third track, said third track having a number of indications which differs from the number of indications of the other tracks by an amount determined by the frequency of signals produced by said synchro device and the revolutions per second of said disc means for combining the signal recorded in said third track with said second signal to eliminate eccentricity in said generated signal.

3. Apparatus as claimed in claim 2, wherein the number of indications in said third track is four times greater than the number of indications of the other tracks.

4. Apparatus as claimed in claim 1, wherein said synchro device is coupled to said other of said members of said transmission by coupling gears, one of said gears being affixed to and rotating with said other of said members and another of said gears being affixed to and rotating with said synchro device, said gears being in coupling engagement with each other thereby adapting said apparatus for measurements of nonuniformities of transmissions having different transmission ratios.

5. Apparatus for measuring nonuniformities of a transmission having a pair of rotatable members one of which rotates at a speed less than the other and in coupling engagement with each other at a large transmission ratio, said apparatus comprising:

first generating means for producing a first alternating electrical signal having a first frequency corresponding to the rotary speed of one of said members, said first generating means includes a disc coaxially mounted with said one of the members of said transmission, said disc having a track thereon having signal indicia recorded therein, and a fixedly supported pickup head in operative proximity with said track for sensing the signal indicia recorded in said track, and further comprising an additional fixedly supported pickup head in operative proximity with said track, said pickup heads being positioned diametrically opposite each other relative to said disc and having electrical output leads connected in series with each other thereby eliminating an adverse effect due to eccentricity of said disc and said one of said members;

second generating means for producing a second alternating electrical signal having a second frequency corresponding to the rotary speed of the other of said members;

means for rotating the other of said members;

adjusting means connected to said first and second generating means for adjusting said first and second signals to equality; and phase comparing means connected to said adjusting means for comparing relative phase variations of said first and second signals.

6. Apparatus for measuring nonuniformities of a transmission having a pair of rotatable members one of which rotates at a speed less than the other and in coupling engagement with each other at a large transmission ratio, said apparatus comprising:

first generating means for producing a first alternating electrical signal having a first frequency corresponding to the rotary speed of one of said members, said one of said members of said transmission has a shaft about which it revolves and said first generating means includes a disc coaxially mounted with said one of the members of said transmission, said disc having a track thereon having signal indicia recorded therein, and a fixedly supported pickup head in operative proximity with said track for sensing the signal indicia recorded in said track, and further comprising a frame for said apparatus, a bridge member for supporting said pickup head and having a sleeve formed therein and coaxially positioned around the shaft of said one of said members and resilient means mounting said bridge member on said frame thereby eliminating an adverse effect due to the eccentricity of said disc and said one of said members;

second generating means for producing a second alternating electrical signal having a second frequency corresponding to the rotary speed of the other of said members;

means for rotating the other of said members;

adjusting means connected to said first and second generating means for adjusting said first and second signals to equality; and phase comparing means connected to said adjusting means for comparing relative phase variations of said first and second signals.

7. Apparatus as claimed in claim 6, wherein said resilient means comprises steel bands.

8. Apparatus as claimed in claim 6, wherein said resilient means comprises a plurality of mutually parallel and mutually perpendicular steel bands.

9. Apparatus for measuring nonuniformities of a transmission having a pair of rotatable members one of which rotates at a speed less than the other and in coupling engagement with each other at a large transmission ratio, said apparatus comprising:

first generating means for producing a first alternating electrical signal having a first frequency corresponding to the rotary speed of one of said members; said first generating means comprising a disc coaxially mounted with said one of the members of said transmission, said disc having two substantially equal tracks thereon each having signal indicia recorded therein, driving means coupled to said disc for rotating said disc at a rotary speed different from the rotary speed of said one of said members, a fixedly supported pickup head in operative proximity with one of the tracks on said disc for sensing the signal indicia recorded in said one track, and a movably supported pickup head affixed to and rotating with said one of said members in operative proximity with the other of the tracks on said disc for sensing the signal indicia recorded in said other track;

means for rotating the other of said members at a constant speed;

second generating means comprising a drum coaxially mounted with the other of said members, said drum having four substantially equal tracks thereon each having signal indicia recorded therein, driving means coupled to said drum for rotating said drum at a rotary speed different from the rotary speed of said other of said members, a pair of fixedly supported pickup heads each in operative proximity with a corresponding one of the tracks on said drum for sensing the signal indicia recorded in two of said tracks, and a pair of movably supported pickup heads coupled to and rotating with said other of said members each in operative proximity with a corresponding one of the other tracks on said drum for sensing the signal indicia recorded in the remaining two of said tracks;

adjusting means connected to said first and second generating means for adjusting said first and second signals to equality; and phase comparing means connected to said adjusting means for comparing relative phase variations of said first and second signals.

10. Apparatus as claimed in claim 9, wherein the signal indicia in the two tracks on said drum sensed by said fixedly supported pickup heads differ from each other by one indication and the signal indicia in the two tracks on said drum sensed by said movably supported pickup heads differ from each other by one indication.

11. Apparatus as claimed in claim 9, wherein the disc of said first generating means has a third track thereon having signal indicia recorded therein and said first generating means further comprises an additional fixedly supported pickup head in operative proximity with said third track on said disc for sensing the signal indicia recorded in said third track.

12. Apparatus as claimed in claim 11, wherein said adjusting means comprises means electrically connected to said pickup heads for converting the signals sensed by said pickup heads to difference frequencies, said third track having a number of indications which differ from the number of indications in the other tracks by an amount determined by a desired difference frequency.